United States Patent
Carson et al.

(10) Patent No.: US 10,071,427 B2
(45) Date of Patent: Sep. 11, 2018

(54) VERTICAL MACHINE TOOL APPARATUS AND METHOD

(71) Applicant: Mazak Corporation, Florence, KY (US)

(72) Inventors: Javon D. Carson, Mason, OH (US); Jonathon Marshall, Amelia, OH (US)

(73) Assignee: MAZAK CORPORATION, Florence, KY (US)

( * ) Notice: Subject to any disclaimer, the term of this patent is extended or adjusted under 35 U.S.C. 154(b) by 220 days.

(21) Appl. No.: 14/846,307

(22) Filed: Sep. 4, 2015

(65) Prior Publication Data

US 2016/0067783 A1 Mar. 10, 2016

Related U.S. Application Data

(60) Provisional application No. 62/046,893, filed on Sep. 5, 2014, provisional application No. 62/047,411, filed on Sep. 8, 2014.

(51) Int. Cl.
*B23Q 37/00* (2006.01)
*B23B 3/06* (2006.01)
(Continued)

(52) U.S. Cl.
CPC .............. *B23B 3/065* (2013.01); *B23Q 1/70* (2013.01); *B23Q 5/20* (2013.01); *B23Q 37/002* (2013.01);
(Continued)

(58) Field of Classification Search
CPC ........ B23Q 5/20; B23Q 37/002; B23B 3/065; B23B 11/00; Y10T 409/309352;
(Continued)

(56) References Cited

U.S. PATENT DOCUMENTS 964,764 A 7/1910 Leeuw
2,368,449 A 1/1945 Stone et al.
(Continued)

FOREIGN PATENT DOCUMENTS

CN 201012456 1/2008
DE 3515520 A1 10/1986
(Continued)

OTHER PUBLICATIONS

Maintenance Manual for Vertical Center Universal 400-Turning, Manual No. CD3OMA0020E, Sep. 2008, 128 pages.
(Continued)

*Primary Examiner* — Ryan Rufo
(74) *Attorney, Agent, or Firm* — Fitch Even Tabin & Flannery, LLP

(57) ABSTRACT

In accordance with one aspect, a vertical machine tool is provided having an upper headstock with an upper spindle and a lower tailstock with a lower spindle. A workpiece is secured to the lower tailstock and the headstock drives the upper spindle and a milling tool connected thereto at high speeds for milling the workpiece. The vertical machine tool is also operable to perform turning operations on the workpiece using a turning tool connected to the headstock spindle. The headstock has a mechanical spindle lock that may be configured to rigidly fix the headstock spindle to the headstock housing so that, during the turning operation, the headstock spindle is secured against rotation from loading applied to the turning tool held in the headstock spindle. The lower tailstock drives the lower spindle to rotate the workpiece at speeds up to 2,500 RPM while the non-rotating turning tool held in the upper headstock machines the workpiece.

9 Claims, 12 Drawing Sheets

(51) Int. Cl.
*B23Q 1/70* (2006.01)
*B23Q 5/20* (2006.01)

(52) U.S. Cl.
CPC ........ *Y10T 29/5107* (2015.01); *Y10T 29/5112* (2015.01); *Y10T 29/5114* (2015.01)

(58) Field of Classification Search
CPC . Y10T 409/309408; Y10T 409/309464; Y10T 29/5112; Y10T 29/5109; Y10T 29/5107; Y10T 29/5105
See application file for complete search history.

(56) References Cited

U.S. PATENT DOCUMENTS

| | | | |
|---|---|---|---|
| 2,876,527 A * | 3/1959 | Matlachowsky | B23B 7/10 29/38 B |
| 2,907,434 A | 10/1959 | Wenzel | |
| 3,355,800 A | 12/1967 | Daugherty | |
| 3,599,260 A | 8/1971 | Lesh | |
| 4,456,412 A | 6/1984 | Ford et al. | |
| 4,507,313 A * | 3/1985 | Braestrup | C07D 487/04 514/220 |
| 4,856,153 A * | 8/1989 | Gusching | B23B 29/046 29/26 A |
| 5,117,544 A | 6/1992 | Kousaku et al. | |
| 5,657,523 A | 8/1997 | Lin et al. | |
| 6,073,323 A | 6/2000 | Matsumoto | |
| 6,918,327 B2 | 7/2005 | Ayrton | |
| 7,448,834 B2 | 11/2008 | Zollmann | |
| 2010/0139065 A1 | 6/2010 | Sahm | |
| 2015/0033918 A1* | 2/2015 | Lindner | B23Q 5/043 82/1.11 |

FOREIGN PATENT DOCUMENTS

| | | | | |
|---|---|---|---|---|
| DE | 3913139 A1 * | 11/1989 | | B23B 19/02 |
| JP | 3966972 B2 * | 8/2007 | | B23B 3/065 |

OTHER PUBLICATIONS

Notification of Transmittal of the International Search Report and the Written Opinion of the International Searching Authority, or the Declaration from the International Bureau of WIPO for International Application No. PCT/US2015/48645 dated Dec. 28, 2015, 12 pages.

* cited by examiner

VERTICAL MACHINE TOOL APPARATUS AND METHOD

CROSS-REFERENCE TO RELATED APPLICATIONS

This application claims the benefit of U.S. Provisional Patent Application No. 62/046,893, filed Sep. 5, 2014, and claims the benefit of U.S. Provisional Patent Application No. 62/047,411, filed Sep. 8, 2014, which are both hereby incorporated by reference in their entireties herein.

FIELD

The field relates to machine tools for performing machining operations on workpieces and, more particularly, to machine tools for performing machining operations on workpieces supported on a horizontal table.

BACKGROUND

Machine tools for machining a workpiece fixedly supported on a horizontally oriented table can have an upper chuck that receives a milling tool. The upper chuck and a milling tool received therein is rotated at high speed around a vertical axis and the chuck may be mounted to move vertically and laterally to perform milling operations on the workpiece secured to the lower table or platform. Whereas the upper chuck and milling tool are driven at a high speed to mill the workpiece, the lower platform remains stationary or is turned slowly during repositioning or contouring of the workpiece. Although these vertical machine tools may provide adequate milling operations on a workpiece, turning or lathe operations on the workpiece may also be desirable. For these prior vertical machine tools, the workpiece would be removed from the machine tool and transported to another machine tool configured for performing turning operations on the workpiece. The use of another machine to perform turning operations increases the complexity, time, and cost of machining a workpiece that requires both milling and turning operations.

SUMMARY

In accordance with one aspect of the present invention, a vertical machine tool is provided for performing a plurality of operations on a workpiece including milling and turning operations. The vertical machine tool includes an upper headstock having a housing and a headstock spindle and a lower tailstock having a rotatable tailstock spindle for supporting a workpiece. The headstock spindle is rotatable relative to the headstock housing and is configured to receive a milling tool or a turning tool. The headstock further includes a mechanical spindle lock having an unlocked configuration that permits the headstock spindle to rotate relative to the headstock housing and perform milling operations on the workpiece with the milling tool. The mechanical spindle lock has a locked configuration that mechanically fixes the headstock spindle relative to the headstock housing and permits the turning tool received in the fixed headstock spindle to perform turning operations on the workpiece with rotation of the tailstock spindle. The mechanical spindle lock provides a rigid, mechanical engagement between the headstock spindle and the headstock housing that is more robust than simply using the internal magnetic resistance of a headstock electric motor to resist rotation of the headstock spindle as in some prior approaches. Even a slight rotation of the headstock spindle during a turning operation may compromise the accuracy of the turning operation. Thus, the mechanical spindle lock mitigates the risk of such a rotation by positively fixing the headstock spindle relative to the headstock housing. In this manner, the vertical machine tool can rigidly hold the headstock spindle and turning tool received therein against rotation even at relatively high rotational speeds of the workpiece, such as in the range of approximately 1,500 rotations per minute (RPM) to approximately 2,500 RPM, and provide accurate and rapid turning operations on the workpiece.

The headstock spindle lock may include an annular locking member extending about the headstock spindle and the headstock housing may include an annular locking portion extending about the headstock spindle. The annular locking member engages the annular headstock housing portion and the headstock spindle around the spindle with the mechanical spindle lock in the locked configuration. By mechanically fixing the headstock spindle to the headstock housing using an annular locking member, the annular locking member can mechanically resist rotation of the headstock spindle around the entirety of or around substantially the entirety of the headstock spindle thereby providing a secure mechanical lock.

In accordance with another aspect, an upper headstock is provided for a vertical machine tool having a lower tailstock that rotatably supports a workpiece. The upper headstock includes a housing, a spindle rotatable about a vertical axis relative to the housing, and a locking member extending about the spindle. The locking member is vertically shiftable along the spindle axis from an unlocked position spaced from the spindle to a locked position engaged with the spindle and the spindle housing to fix the spindle relative to the housing. Because the locking member physically engages the spindle and the housing, the locking member mechanically fixes the headstock spindle against rotation during a turning operation more rigidly than using the internal magnetic resistance of a headstock electric motor.

In one form, the headstock spindle, housing, and locking member each include annular portions. The annular portion of the locking member is sized radially so that the locking member annular portion is axially aligned with both of the spindle annular portion and the housing annular portion. With the locking member vertically shifted to the locked position thereof, the locking member annular portion engages both of the spindle annular portion and the housing annular portion.

A method is provided for performing a turning operation on a workpiece using a vertical machine tool having an upper headstock and a lower tailstock. The method includes connecting a workpiece to a tailstock spindle of the lower tailstock and mechanically fixing a headstock spindle of the upper headstock relative to a housing of the headstock. The method further includes rotating the tailstock spindle and the workpiece to machine the workpiece using a turning tool secured to the mechanically fixed headstock spindle. The method provides improved resistance to turning of the spindle, which could adversely affect the accuracy of the turning operation, by mechanically fixing the headstock spindle and performing the turning operation using a turning tool secured to the mechanically fixed headstock spindle.

In one approach, rotating the tailstock spindle and the workpiece includes rotating the tailstock spindle and workpiece at a speed in the range of approximately 1,500 RPM to approximately 2,500 RPM, in the range of approximately 2,000 RPM to approximately 2,500 RPM, or in the range of approximately 2,250 RPM to approximately 2,500 RPM.

These high speeds permits faster machining of workpieces and improved efficiency of the vertical machine tool.

DETAILED DESCRIPTION

Figure 1:
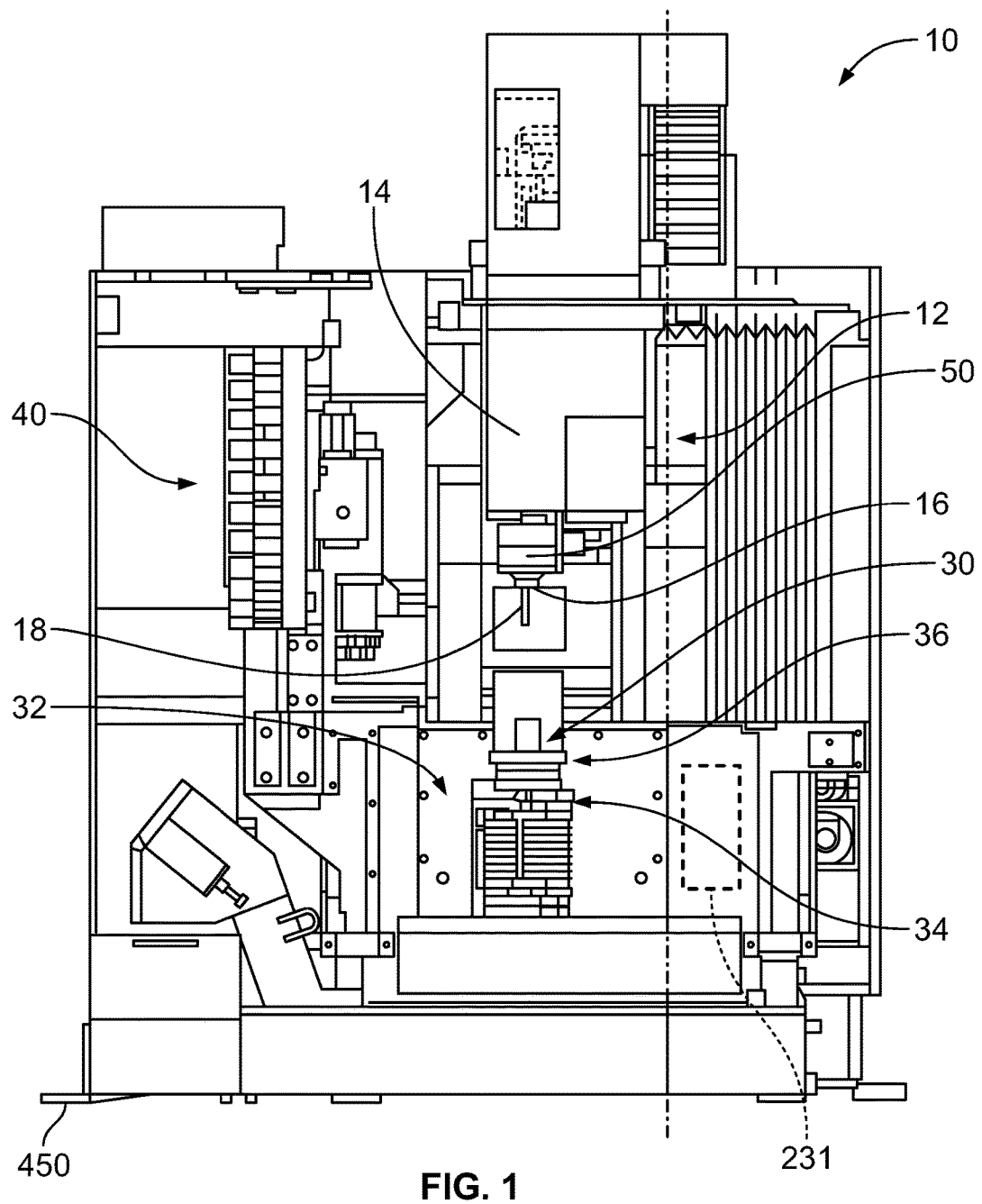
FIG. 1 is a front elevational view of a machine tool having an upper headstock for rotatably driving a vertically oriented tool and a lower tailstock with a rotatable table supporting a workpiece below the tool.

A vertical machine tool is provided that is operable to perform both milling and turning operations on a workpiece. The vertical machine tool has an upper headstock with a vertically-oriented upper headstock spindle that extends downward and a lower tailstock with an upwardly extending lower tailstock spindle. The workpiece may be mounted to the tailstock spindle, and the headstock has a motor for driving the headstock spindle and a milling tool connected thereto at high speeds, such as 12,000-20,000 RPM, for milling the workpiece. As used herein, milling refers to using a rotating tool for shaping surfaces of a workpiece. The tailstock has a motor that may rotate the tailstock spindle at relatively low speeds during milling of the workpiece to reposition or contour the workpiece, such as less than 50 RPM, and such as in the range of approximately 35 RPM to approximately 50 RPM.

In addition to performing milling operations, the vertical machine tool is operable to perform turning operations on the workpiece using a turning tool connected to the headstock spindle which is secured against rotation during the turning operations. Turning, as used herein, refers to using a stationary or substantially stationary tool to shape surfaces of a rotating workpiece. The headstock has a locking mechanism that may be shifted from an unlocked configuration to a locked configuration and positively fix the headstock spindle relative to a housing of the headstock. The locking mechanism provides a rigid coupling between the headstock spindle and the headstock housing so that the headstock spindle is secured against rotation from loading applied to the turning tool held in the headstock spindle during turning operations. By utilizing a rigid coupling between the headstock spindle and the headstock housing, the headstock spindle is more stable than if magnetic resistance of the headstock motor alone was used to resist rotation of the headstock spindle.

With the locking mechanism in the locked configuration, the headstock spindle and turning tool held therein are positively fixed against rotation relative to the headstock housing during turning operations. To rotate the workpiece during these turning operations, the lower tailstock motor is sized to be operable to rotate the tailstock spindle at speeds typically used in turning operations, such as up to 2,500 RPM and in a range of between approximately 35 RPM and approximately 2,500 RPM, as the non-rotating turning tool held in the headstock spindle machines the workpiece. The tailstock motor is operable to drive the lower turning spindle at speeds much higher than conventional vertical machine tools, which have tailstock table speeds in the range of 40-50 RPM. Because these prior vertical machine tools are not configured to rotate a workpiece at higher speeds, they are not able to perform a turning operation where the tool machining the workpiece is not being rotated.

In one form, the locking mechanism of the upper headstock comprises a portion of the headstock housing, a portion of the spindle, and a locking member shiftable between unlocked and locked positions to uncouple and couple the housing and spindle portions. With the locking member in the unlocked position, the housing and spindle portions are uncoupled which permits the spindle to rotate relative to the housing. The locking member may be shifted to the locked position so that the locking member engages the housing and spindle portions and positively fixes the spindle portion against rotation relative to the housing during a turning operation. The locking member may be made of a rigid material, such as steel, and transfers loading from the spindle portion to the housing portion during the turning operation. The locking member thereby provides a rigid load bearing member to resist rotation of the spindle portion relative to the housing portion. By using the term rigid with respect to a part, it is intended that the part maintains its shape and does not significantly deform such that it cannot perform its intended function during normal operation of the vertical machine tool. In one approach, the vertical machine tool includes a controller and the locking mechanism includes an actuator that the controller may operate to shift the locking member between the unlocked and locked positions.

With reference to FIG. 1, a vertical machine tool 10 is provided including a rotary drive such as a motor 14 for driving an upper spindle 16 to which a tool 18 may be secured. The machine 10 is operable to move the rotating upper spindle 16 in X, Y, and Z axes as discussed in greater detail below to mill a workpiece 30 secured to a lower tailstock 32. The workpiece may be a metal workpiece, such as steel, cast iron, aluminum, or metal alloys. Besides milling, the spindle 16 may be rotated to perform contouring, drilling, and tapping on the workpiece 30 using appropriate tools 18. The motor 14 is sized to provide sufficient power to drive the spindle 18 during the various operations that may be performed using the corresponding tools 18 received in the spindle 16. In one form, the motor 14 has a continuous rating of 10 horsepower and a thirty-minute rating of 15 horsepower.

The lower tailstock 32 includes a rotary drive, such as a motor 34, for driving a lower spindle 36. The motor 34 may rotate the lower spindle 36 at much higher speeds than prior vertical machine tools so that, with a turning tool 18 secured to the non-rotating upper spindle 16, the motor 34 can drive the lower spindle 36 and cause the non-rotating turning tool 18 to perform turning metal cutting operations on the workpiece 30. In one form, the motor 34 has a continuous rating of 10 horsepower and a thirty-minute rating of 15 horsepower. The vertical machine tool 10 includes a tool storage and changing apparatus, which may include a carousel tool magazine 40, for holding a plurality of milling and turning tools that can be automatically loaded into and removed from the upper spindle 16.

Figure 2:
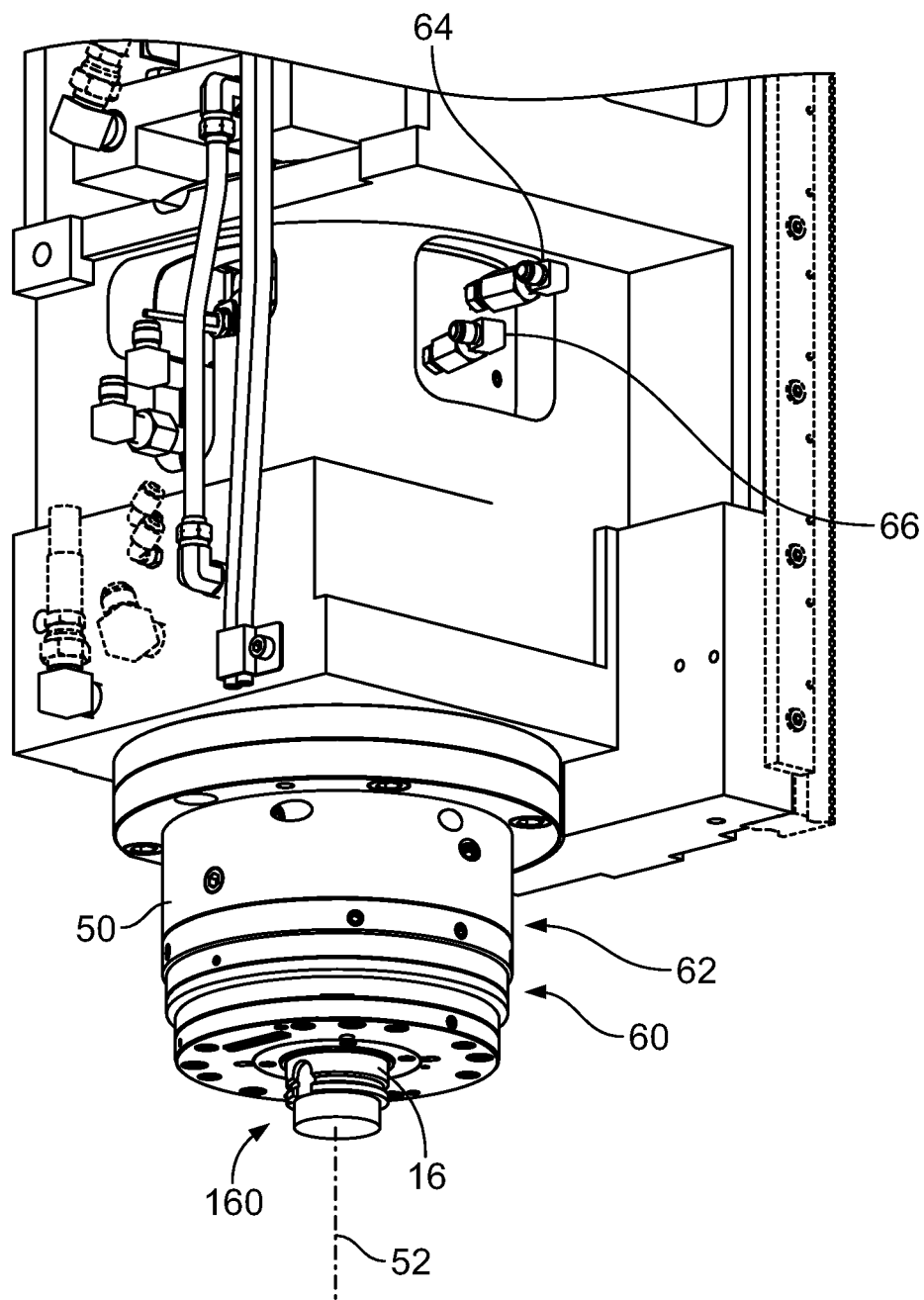
FIG. 2 is a perspective view of the headstock of the machine tool of FIG. 1 showing a portion of a spindle depending from a spindle housing of the upper headstock.

With reference to FIG. 2, the upper headstock 12 includes a housing 50 that supports the upper spindle 16 as the spindle 16 rotates about a vertical milling axis 52. The upper spindle 16 includes a tool receiving socket 160 for releasably engaging the tool 18 used to machine the workpiece 30. The spindle 16 may be driven in clockwise or counter-clockwise directions about the axis 52 to rotate the tool 18 and mill the workpiece 30. The upper headstock 12 includes a locking mechanism 60 for selectively fixing the spindle 16 against rotation relative to the housing 50. By fixing the spindle 16 against rotation relative to the housing 50, the spindle 16 may hold a turning tool 18 rigidly against rotation and loading from the workpiece 30 as the lower spindle 36 rotates and performs a turning operation on the workpiece 30 using the non-rotating turning tool 18 held by the upper spindle 16 for cutting material, typically metal, from the workpiece. In one approach, the locking mechanism 60 includes an actuator 62 that reconfigures the locking mechanism 60 between an unlocked configuration that permits the spindle 16 to rotate relative to the housing 50 and a locked configuration that fixes the spindle 16 against rotation relative to the housing 50. In one approach, the actuator 62 is a hydraulic actuator and includes hydraulic fluid ports 64, 66 that respectively permit fluid flow into and out of chamber 68 (FIG. 4) and chamber 70 (see FIG. 8) to control the position of a locking member, as will be discussed in greater detail below.

Figure 3:
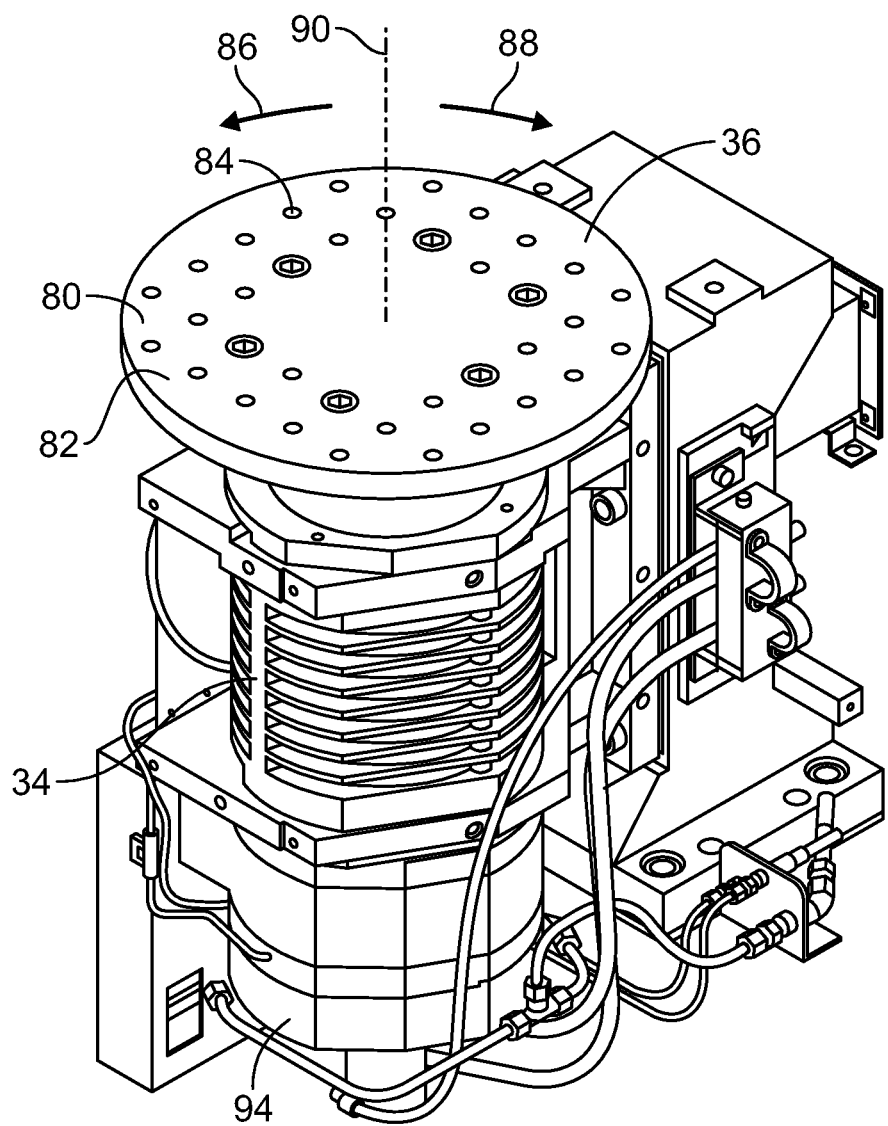
FIG. 3 is a perspective view of the lower tailstock of the machine tool of FIG. 1 showing a motor for rotating the table and workpiece thereon at speeds sufficient to perform turning operations on the workpiece using the tool of the upper headstock.

With reference to FIG. 3, the lower spindle 36 includes a support, such as a table 80, having an upwardly facing surface 82 and openings 84 for receiving bolts or other attachment structures for fixedly securing the workpiece 30 to the table surface 82. The table 80 may have a circular shape and, in one form, has an outer diameter of approximately 400 mm. The motor 34 is operable to rotate the spindle 36 slowly in directions 86, 88 about a vertical axis 90 throughout 360 degrees of motion during milling operations to reposition the workpiece 30 as the upper spindle 16 and tool 18 rotate and mill the workpiece 30. The lower tailstock 32 may also include a brake 94 configured to slow rotation of the spindle 36 in either direction 86, 88, as well as to secure the spindle 36 against rotation due to loading from milling operations on the workpiece 30.

In addition to slowly turning the spindle 36 during milling operations, the motor 34 is also operable to rotate the spindle 36 at higher speeds throughout 360 degrees of motion while the upper spindle 16 is fixed against rotation by the locking mechanism 60 so that the tool 18 connected to the upper spindle 16 can perform turning operations on the workpiece 30. During turning operations, the motor 34 can drive the spindle 36 in direction 86 or 88 at speeds, for example, of greater than 500 RPM, greater than 1000 RPM, greater than 1500 RPM, greater than 2000 RPM, and up to and including 2500 RPM. In one approach, the motor 34 can drive the spindle 36 in direction 86 or 88 at speeds in the range of approximately 35 RPM to approximately 2,500 RPM. The motor 34 drives the spindle 36 at speeds closer to 35 RPM for repositioning or contouring operations and the motor 34 rotating the spindle at speeds closer to 2,500 RPM for turning operations. The motor 34 may therefore rotate the spindle 36 and workpiece 30 connected thereto at sufficient speed to perform turning operations on the workpiece 30 whereas the slower lower table speeds of prior vertical machining centers, which may be in the range of 40-50 RPM, are unacceptable for turning operations.

Figure 4:
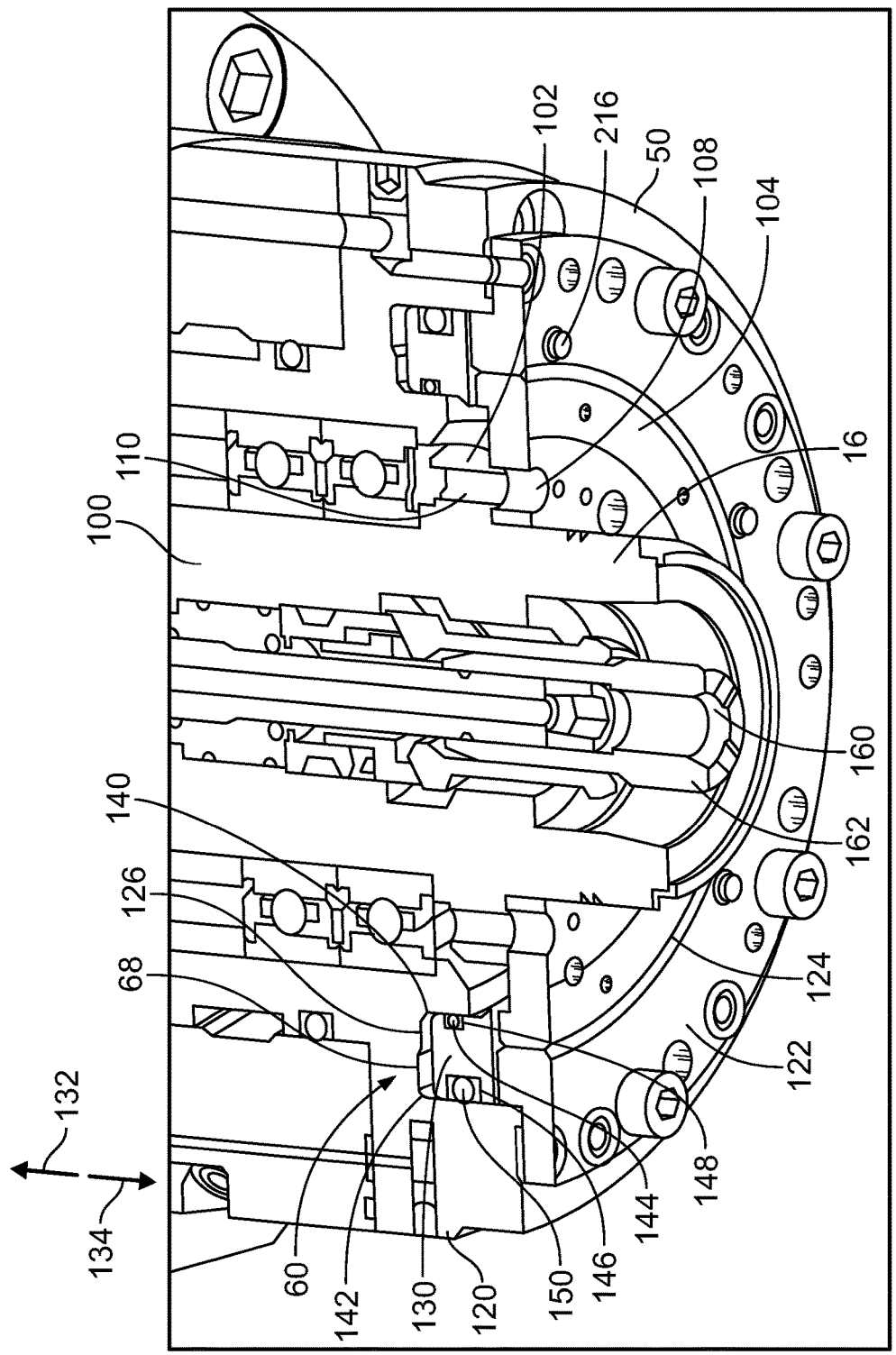
FIG. 4 is a cross-sectional view of a portion of the headstock of FIG. 2 showing a locking mechanism for securing the spindle against rotation relative to the spindle housing that includes a ring of the spindle, a ring of the housing, and a locking ring shiftable between unlocked and locked positions to uncouple and rigidly couple the spindle and housing rings.

With reference to FIGS. 4-9B, an embodiment of the locking mechanism 60 will be discussed in greater detail. In FIG. 4, a portion of the spindle headstock housing 50 has been removed to show the spindle 16 and components of the locking mechanism 60. The spindle 16 has a generally tubular spindle wall 100 with a flange 102 extending outwardly therefrom. The spindle 16 includes a spindle locking portion, such as a spindle ring 104, secured to the spindle flange 102 via bolts 106 (see FIG. 8) extending through openings 108, 110 in the flange 102 and the ring 104. The bolts 106 rigidly mount the spindle ring 104 to the spindle wall 100 so that the spindle ring 104 rotates with rotation of the spindle wall 100. The housing 50 includes a body 120 and a housing locking portion, such as housing ring 122, mounted to the body 120. Whereas the spindle ring 104 rotates about the axis 52 with rotation of the spindle 16, the housing ring 122 is mounted to the housing body 120 and does not rotate as the spindle 16 rotates. The housing ring 122 has an inner, central opening 124 sized to receive the smaller diameter spindle ring 104 concentrically therein and provide sufficient clearance therebetween to accommodate the rotation of the spindle ring 104.

With reference to FIG. 4, the locking mechanism 60 further includes a locking member, such as a locking ring 130, that is shiftable between an unlocked position that permits the spindle ring 104 to rotate relative to the housing ring 122 and a locked position that fixes the spindle ring 104 to the housing ring 122 so that the spindle ring 104 and spindle 16 are secured against rotation relative to the housing 50. The housing body 120 includes an annular channel 126 extending about the spindle 16 that receives the locking ring 130. The channel 126 is sized to permit the locking ring 130 to shift upwardly and downwardly in directions 132, 134 in the channel 126 to selectively engage and disengage the spindle ring and housing ring, 104, 122 as will be discussed in greater detail below. The channel 126 includes channel walls 140, 142 that guide the locking ring 130 as it travels upwardly and downwardly and uncouples and couples the spindle and housing rings 104, 122. The locking ring 130 includes inner and outer recesses 144, 146 that face the walls 140, 142 and receive sealing elements, such as o-rings 148, 150, for resisting the passage of hydraulic fluid past the locking ring 132 in the channel 126.

Figure 5:
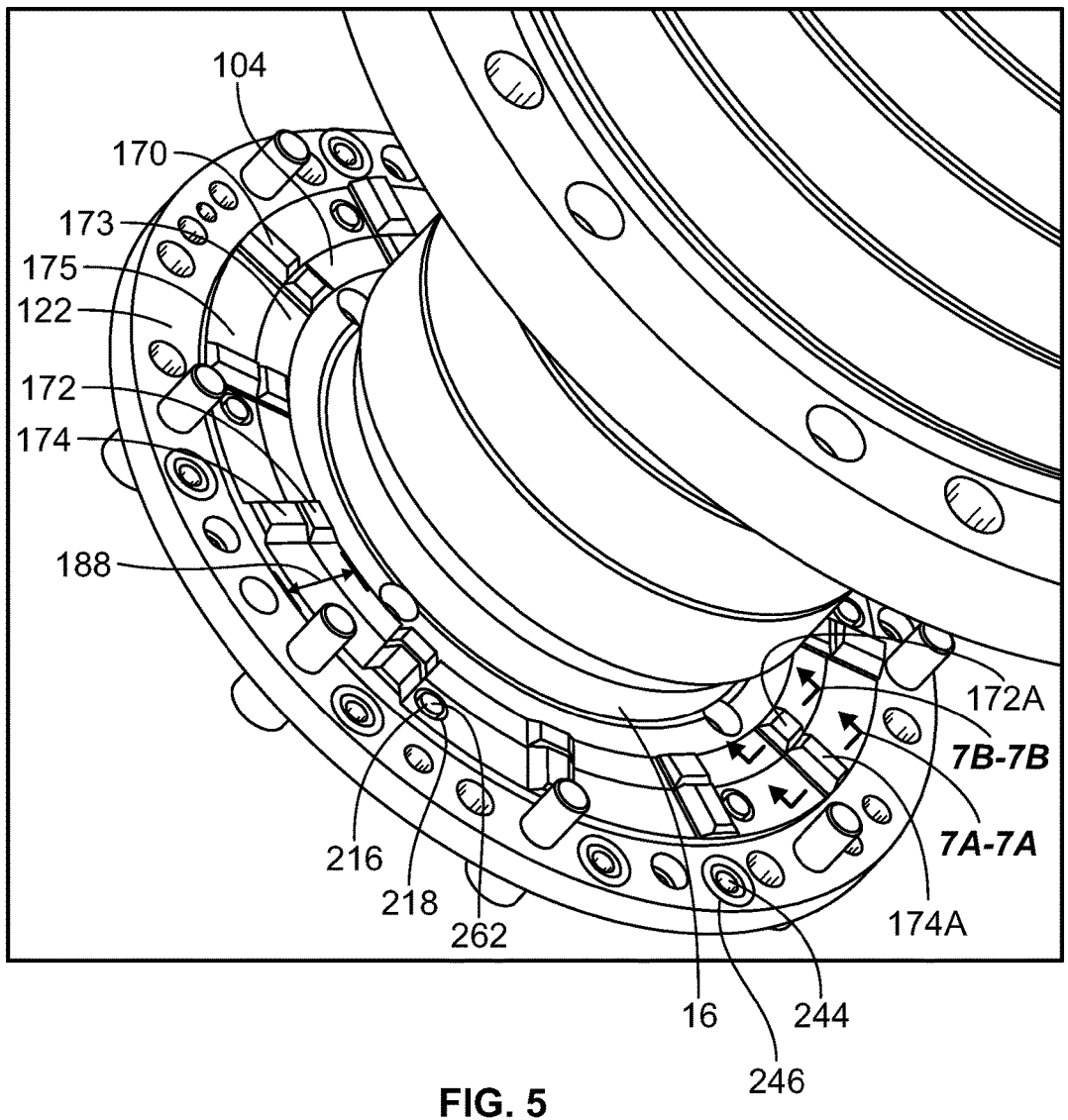
FIG. 5 is an upper perspective view a portion of the headstock of FIG. 4 showing the spindle and the ring thereof rotated to a position that radially aligns teeth on an upper surface of the spindle ring with teeth on an upper surface of the housing ring with the locking ring omitted to show these features.

With reference to FIG. 5, a top perspective view of the spindle and housing rings 104, 122 is provided with many of the other components of the upper headstock 12 removed. The spindle ring 104 and the housing ring 122 include coupling members 170, such as respective teeth 172, 174, evenly circumferentially spaced about upper surfaces 173, 175. The teeth 172, 174, may have a polygonal shape that forms a crenulated profile of the upper surfaces 173, 175 of the spindle and housing rings 104, 122. In one approach, the vertical machine tool 10 has a spindle position sensor and the headstock motor 14 is operated to rotate the spindle 16 and ring 104 thereof so that the teeth 172, 174 are radially aligned prior to the locking ring 130 being shifted in direction 134 into locking engagement with the spindle and housing rings 104, 122. This positions the teeth 172 of the spindle ring 104 in rotational alignment with the teeth 174 of the housing ring 122 and recesses 184 of the locking ring 130 with the locking ring 130 being disposed above the spindle and housing rings 104, 122. The sensing using the spindle position sensor and operating of the headstock motor 14 is preferably performed automatically by a controller 231 of the vertical machine tool 10 without requiring user intervention. In one form, the headstock 12 orients the spindle 16 using twenty-four degree spindle index positioning.

Figure 6:
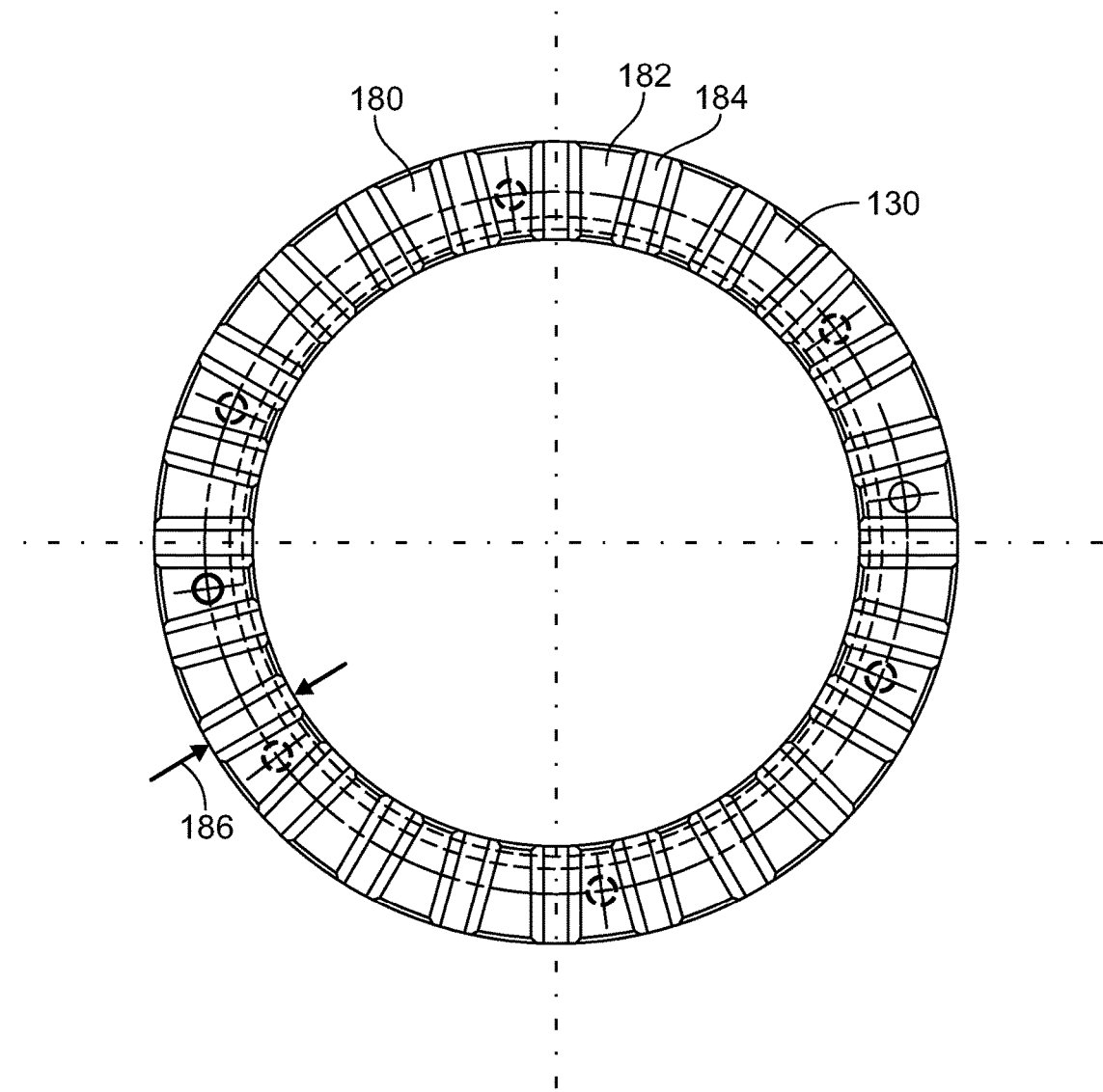
FIG. 6 is a bottom plan view of the locking ring showing a lower surface of the locking ring that seats against the upper surfaces of the spindle and housing rings when the locking ring is shifted to the locked position thereof.

With reference to FIG. 6, the locking ring 130 has a lower surface 180 positioned above the spindle and housing rings 104, 122 with the locking ring 130 in the unlocked position. The locking ring 130 has coupling members, such as raised lands 182, spaced around the locking ring 130 and separated by the recesses 184. The locking ring recesses 184 also have widths 186 in the circumferential direction that are at least as wide as circumferential widths 188 (see FIG. 5) of the aligned teeth 172, 174 of the spindle and housing rings 104, 122. Each recess 184 of the locking ring 130 is configured and sized to receive one pair of the aligned teeth 172, 174 of the spindle and housing rings 104, 122. As the locking ring 130 is shifted in direction 134 toward its locked position, the lands 182 of the locking ring 130 advance in direction 134 on opposite lateral sides of the aligned teeth 172, 174, and the aligned teeth 172, 174 are received in the recesses 184 of the locking ring 130 until the locking ring lands 182 engage the upper surfaces 173, 175 of the spindle and housing rings 104, 122. The lands 182 of the locking ring 130 have polygonal shapes to mate with the polygonal teeth 172, 174 of the spindle and housing rings 104, 122. Further, the lands 182 form a generally crenulated shape of the lower surface 180 of the locking ring 130. When the locking ring 130 is seated against the spindle and housing rings 104, 122, the intermeshed crenulated shapes of the lower surface 180 of the locking ring 130 and the upper surfaces 173, 175 of the spindle and housing rings 104, 122 produce a rigid construct that resists rotary movement of the spindle ring 104. Further, the annular shape of the spindle ring 104, housing ring 122, and locking ring 130 provide space for a large number of engaged teeth 172, 174 and recesses 184 with each pair of engaged teeth 172, 174 and recess 184 increasing the rigidity of the construct of the mated spindle ring 104, housing ring 122, and locking ring 130. It will be appreciated that instead of a ring shape, the spindle ring 104, housing ring 122, and locking ring 130 may take other shapes such as U-shaped, polygonal or straight members for example. Further, these elements may be oriented to extend tangentially relative to the headstock spindle 16 or radially away from the headstock spindle 16.

During turning operations, the vertical machine tool 10 maintains a high pressure of the hydraulic fluid within chamber 68 (see FIG. 8) above the locking ring 130 which keeps the locking ring 130 pressed against the spindle and housing rings 104, 122. This keeps the teeth 172, 174 of the spindle and housing rings 104, 122 firmly seated in the locking ring recesses 184 and resists rotation of the spindle ring 104.

Figure 7B:
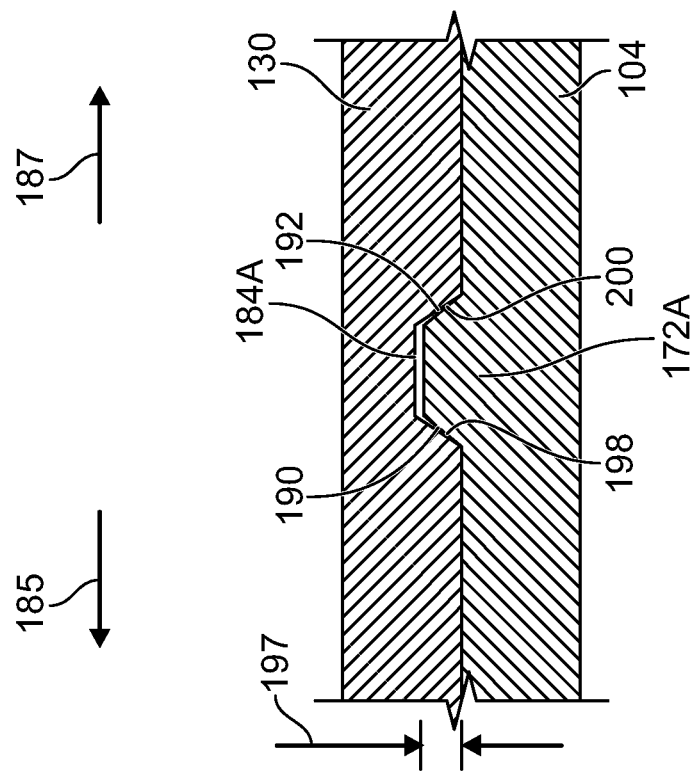
FIG. 7B is a cross-sectional view taken across line 7B-7B in FIG. 5 showing the locking ring lower surface seated against the spindle ring upper surface and one of the teeth of the spindle ring engaged with opposite lateral sides of one of the locking ring recesses.
Figure 7A:
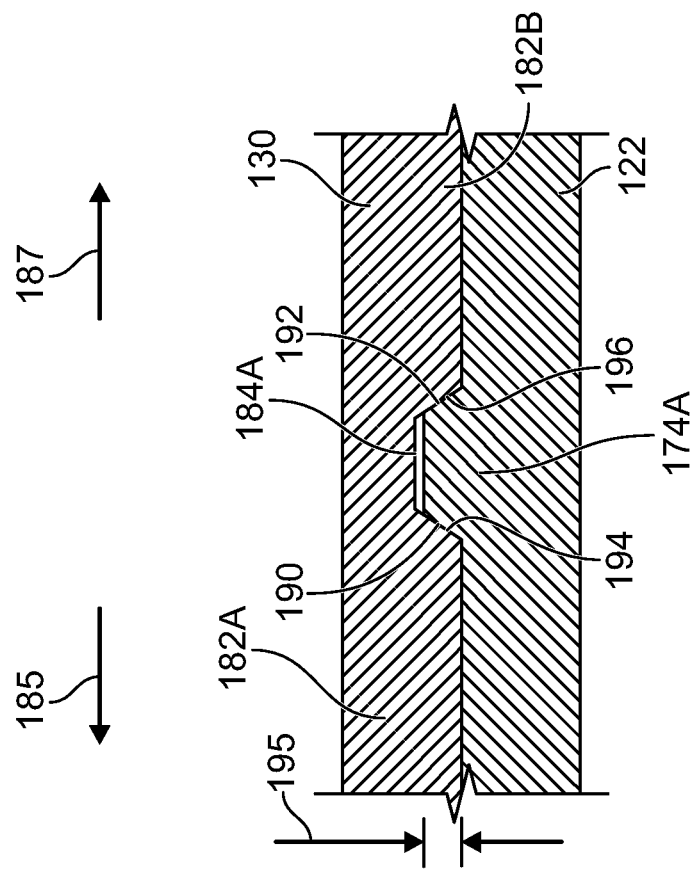
FIG. 7A is a cross-sectional view taken across line 7A-7A in FIG. 5 showing the locking ring lower surface seated against the housing ring upper surface and one of the teeth of the housing ring matingly engaged in one of the recesses of the locking ring.

With reference to FIG. 7A, a pair of locking ring lands 182A, 182B are shown engaged with opposite lateral sides of a tooth 174A (see FIG. 5) of the housing ring 122. The tooth 174A is received in one of the recesses 184A of the locking ring 130 between the locking ring lands 182A, 182B. Because the housing ring tooth 174A and spindle ring tooth 172A are radially aligned (see FIG. 5) and extend along the recess 184A, the locking ring lands 182A, 182B are also engaged with laterally opposites sides of the tooth 172A of the spindle ring 104 as shown in FIG. 7B. Stated differently, the recesses 184 have walls 190, 192 of the lands 182A, 182B extending radially along and abutting lateral surfaces 194, 196 of the tooth 174A as well as lateral surfaces 198, 200 of the tooth 172A with the locking ring 130 shifted to its locked position.

With reference to FIGS. 4 and 7A, the housing ring 122 is rigidly mounted to the housing body 120 and generally does not move relative to the housing body 120. Once the locking ring lands 182A, 182B are engaged with the opposite lateral surfaces 192, 194 of the housing ring tooth 174A, rotation of the locking ring 130 in direction 185 (see FIG. 7A) presses the locking ring wall 192 tightly against the housing disc tooth lateral surface 196 so that the housing disc tooth 174A resists further rotation of the locking ring 130 in direction 185. Similarly, rotation of the locking ring 130 in direction 187 presses the locking ring wall 190 against the housing disc tooth lateral surface 194 so that the housing disc tooth 174A resists further rotation of the locking ring 130 in direction 187. The engagement of the lands 182 of the locking ring 130 with the teeth 174 of the housing ring 122 produces a rigid coupling between the locking ring 130 and housing ring 122 so that the locking ring 130 is restricted from rotating relative to the housing ring 122 with the locking ring 130 in the locked position thereof.

With the engaged teeth 174, 182 of the housing and locking rings 122, 130 resisting rotation of the locking ring 130 relative to the housing ring 122, the recesses 184 of the locking ring 130 also receive the teeth 172 of the spindle ring 104 and resist rotation of the spindle ring 104 relative to the locking ring 130 once the locking ring 130 has been shifted to the locked position thereof. With reference to FIG. 7B, rotation of the spindle ring 104 in direction 185 presses the spindle ring tooth lateral surface 198 tightly against the locking ring wall 190. As discussed above, the locking ring 130 is restricted from rotating in direction 185 by the engagement of the locking ring wall 192 against the housing disc tooth lateral surface 196. Because the locking ring 130 is held against rotation in direction 185 by the housing ring 122, the non-rotating locking ring 130 resists rotation of the spindle ring 104 in direction 185 from loading imparted on the tool 18 during turning operations.

With reference to FIG. 7B, rotation of the spindle ring 104 in direction 187 presses the spindle ring tooth lateral surface 200 tightly against the locking ring wall 192. As discussed above, the locking ring 130 is restricted from rotating in direction 187 by the engagement of the locking ring wall 190 against the housing disc tooth lateral surface 194. Because the locking ring 130 is held against rotation in direction 187 by the housing ring 122, the non-rotating locking ring 130 resists rotation of the spindle ring 104 in direction 187 during turning operations. The locking ring 130 thereby operates as a load bearing member transmitting loading from the spindle ring 104 to the housing ring 122 which, in turn, transmits the loading to the housing body 120. In this manner, the locking ring 130 fixes the spindle ring 104 to the housing ring 122 and resists rotation of the spindle 16. Further, the abutting locking ring walls 190, 192 and lateral surfaces 194, 196 and 198, 200 of the spindle and housing rings 104, 122 operate as hard stops that engage and resist rotation of the spindle 16 relative to the housing 50 once the locking ring 130 has been shifted to the locked position.

It will be appreciated that the teeth 172, 174 and recesses 184 may have a number of different shapes, such as half cylinders or posts, which provide the desired engagement between the rings 104, 122, 130. In another approach, the teeth 172, 174 of the spindle and housing rings 104, 122 are instead radially extending depressions and the locking ring lands 182 are sized to extend into and engage the depressions to couple the spindle and housing rings 104, 122.

Figure 8:
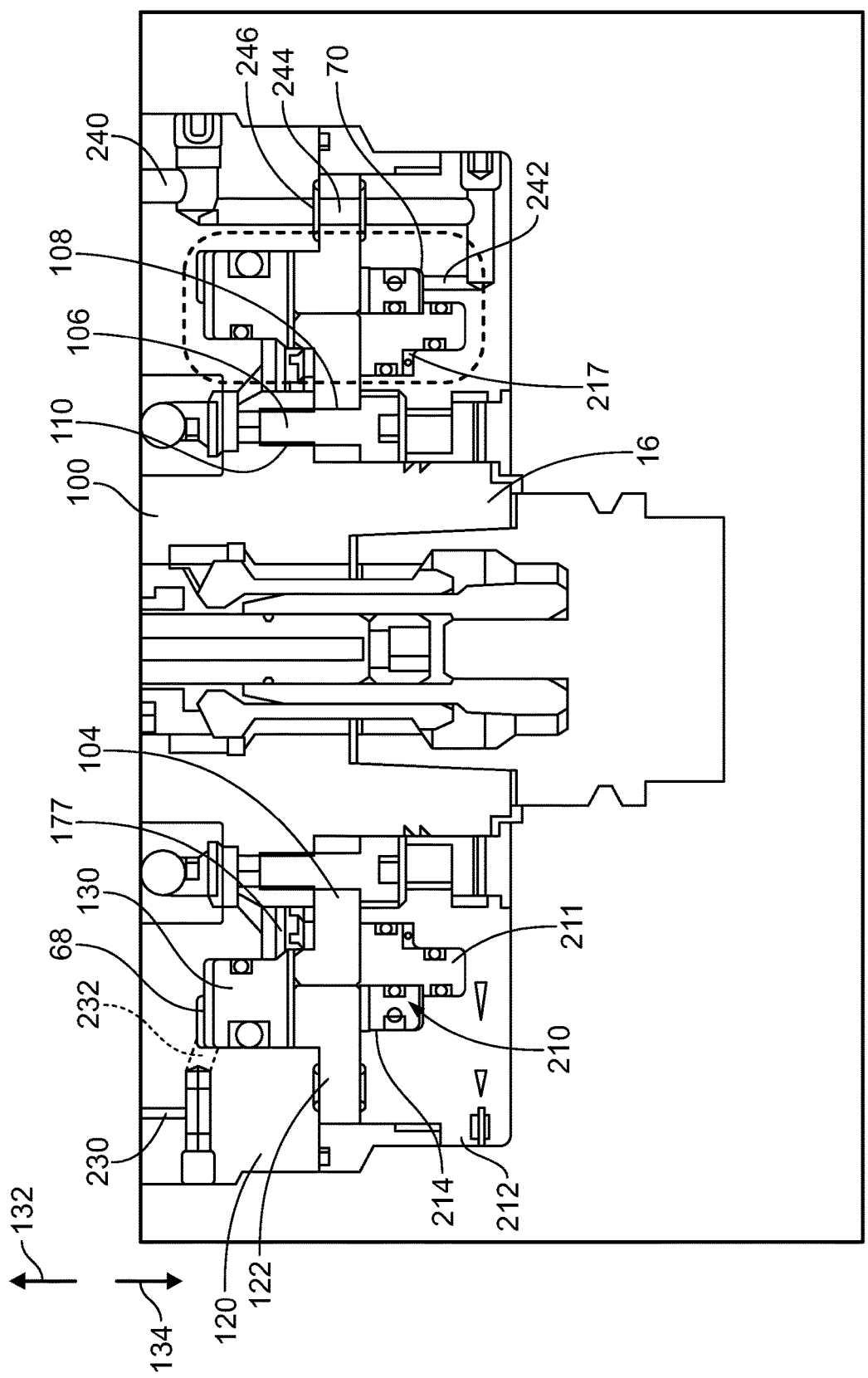
FIG. 8 is a cross-sectional view similar to FIG. 4 showing portions of the headstock below the housing and spindle rings including a pusher ring disposed below the housing ring and a clamping ring disposed below the spindle ring.
Figure 9B:
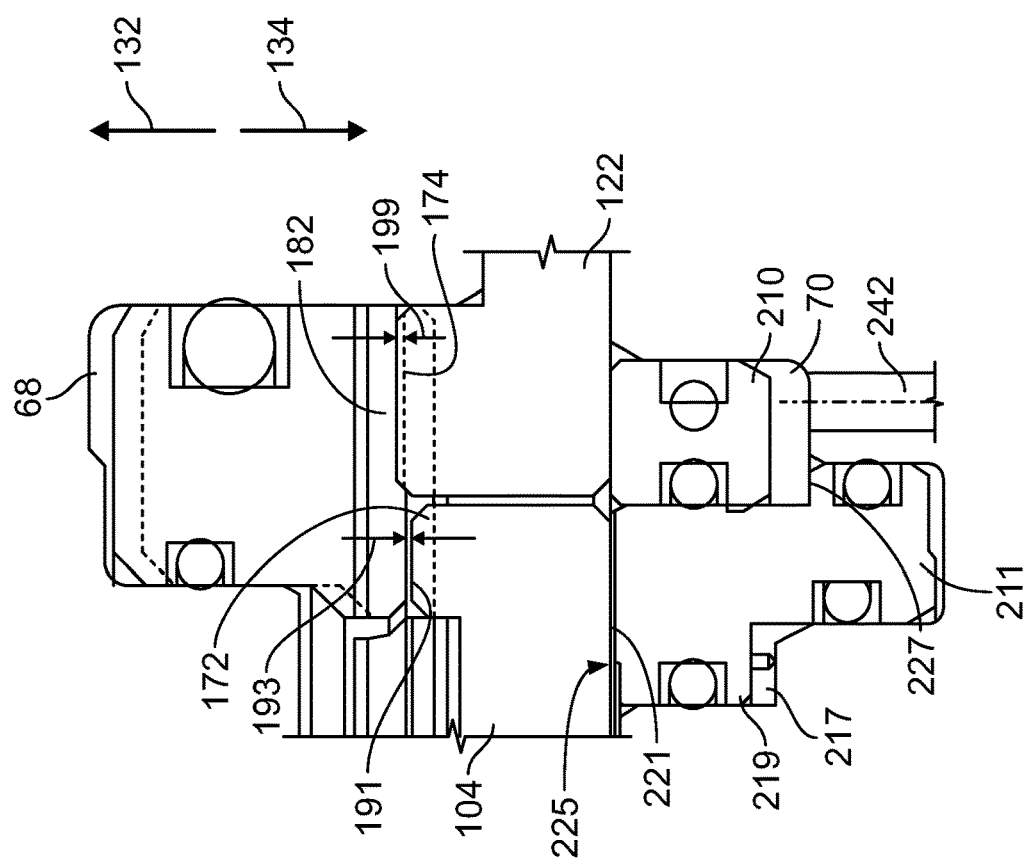
FIG. 9B is a view similar to FIG. 9A showing the locking and clamping rings in unlocked positions thereof spaced from the spindle and housing rings to uncouple the spindle from the housing and permit rotation of the spindle.

With reference to FIGS. 8-9B, the locking mechanism 60 may also include an unlocking member, such as a pusher ring 210, for shifting the locking ring 130 from the locked position to the unlocked position and uncoupling the spindle ring 104 from the housing ring 122. More specifically, the housing 50 includes a cap 212 with an annular channel 214 that extends about the spindle 16. The pusher ring 210 is movable upwardly and downwardly in directions 132, 134 in the channel 214 in response to the pressure of hydraulic fluid in the chamber 70 being increased or decreased. With reference to FIG. 5, the pusher ring 210 has pins 216 extending upwardly through openings 218 in the housing ring 122 so that the pins 216 may abut and lift the locking ring 130 upward in direction 132 as the pressure in the chamber 70 is increased and the pusher ring 210 shifts upwardly in direction 132.

Because the pusher ring pins 216 lift the locking ring 130 in direction 132 away from the locked position (FIG. 9A) toward the unlocked position (FIG. 9B), the lands 182 of the locking ring 130 are shifted upwardly so that the teeth 172 of the spindle ring 104 are shifted out from the locking ring recesses 184 so as to be in clearance relative thereto. With the locking ring 130 in the unlocked position, there is an axial gap 191 (see FIG. 9B) with a clearance amount 193 between the lands 182 of the locking ring 130 and the teeth 172 of the spindle ring 104. Because the locking ring lands 182 are in clearance with the spindle ring teeth 172, the spindle and housing rings 104, 122 are uncoupled so that the spindle ring 104 may now rotate in response to driving of the spindle 16 by the headstock motor 14. With respect to FIGS. 4, 6, 8, and 9B, the headstock 14 includes a chamber 177 that supplies hydraulic fluid to the lower surface 180 of the locking ring 130 and fills the gap 191.

With reference to FIGS. 7A and 7B, the teeth 174 of the housing ring 122 may have an axial height 195 that is taller than an axial height 197 of the teeth 172 of the spindle ring 104. Due to the taller height 195 of the housing ring teeth 174, the locking ring lands 182 may not be in clearance with the housing ring teeth 174 when the locking ring 130 is shifted to the unlocked position (see FIG. 9B). Rather, there may be an axial overlap amount 199 between the locking ring lands 182 and the housing ring teeth 174. Although the locking ring lands 182 may not be firmly engaged with the housing ring teeth 174, the overlap 199 permits portions of the locking ring walls 190, 192 (see FIG. 7A) to abut the housing ring teeth lateral surfaces 194, 196 so that the housing ring teeth lateral surfaces 194, 196 resist rotation of the locking ring 130 within the housing 50. In this manner, the housing ring teeth 174 maintain the rotary position of the locking ring 130 relative to the housing ring 122 when the locking ring 130 is in the unlocked position and, specifically, keep the recesses 184 of the locking ring 130 aligned with and above the teeth 174 of the housing ring 122.

With reference to FIGS. 8-9B, the locking mechanism 60 may also include a clamping device, such as a clamping ring 211, for clamping the spindle ring 104 against the locking ring 130 when the locking ring 130 is in the locked configuration. The clamping ring 211 is received in the channel 214 of the housing cap 212 radially inward from the pusher ring 210. The clamping ring 211 has an outer bearing surface 215 along which the pusher ring 210 may slide vertically as the chamber 70 below the pusher ring 210 is pressurized and depressurized to cause movement of the pusher ring 210 in directions 132, 134. The pusher ring 210 and the clamping ring 211 can move independently of each other vertically in the channel 214.

Figure 9A:
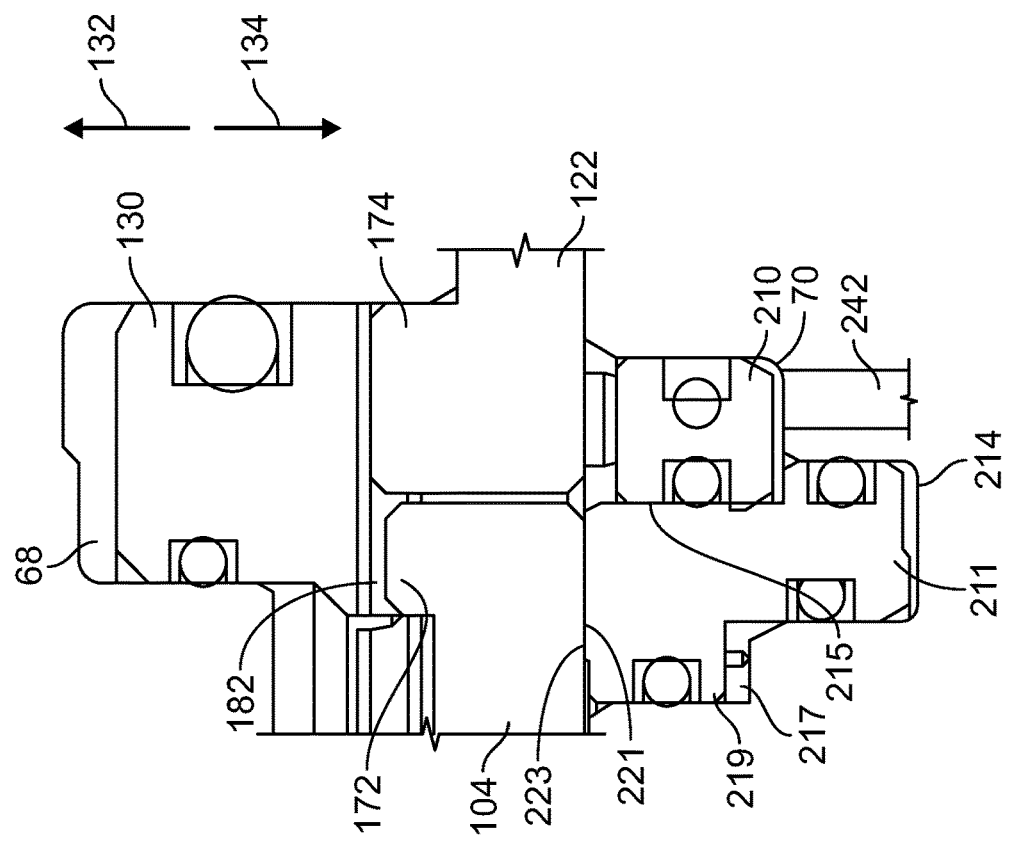
FIG. 9A is an enlarged view of the dashed area of FIG. 8 showing the locking and clamping rings in locked positions thereof engaging the spindle and housing rings and the pusher ring shifted away from the housing ring.

As shown in FIG. 9A, the housing 50 has a chamber 217 for hydraulic fluid below an inner portion 219 of the clamping ring 211 that may be pressurized to apply force in direction 132. This shifts an inner head 221 of the clamping ring 211 against an underside 223 of the spindle ring 104 and urges the spindle ring 104 in direction 132 against the lower surface 180 of the locking ring 130. Concurrently, the high pressure in the chamber 68 urges the locking ring 130 in direction 134 against the upper surface 173 of the spindle ring 104. In this manner, the locking configuration of the locking ring 130 and the clamping ring 211 sandwiches the spindle ring 104 between the locking ring 130 and clamping ring 211 so that the locking ring and spindle ring teeth 172, 182 remain firmly engaged and resist rotation of the spindle ring 104 relative to the locking ring 130.

To shift the clamping ring 211 in direction 134 to its unlocked position (see FIG. 9B), the pressure of the hydraulic fluid in the chamber 70 is increased. Increasing the pressure of the hydraulic fluid in the chamber 70 thereby performs two operations related to uncoupling the spindle ring 104 from the housing ring 122. First, as discussed above, increasing the pressure in the chamber 70 shifts the pusher ring 210 in direction 132 so that pins 216 lift the locking ring 130 in direction 132 and disengage the spindle ring teeth 172 and locking ring recesses 184. Second, increasing the pressure in the chamber 70 generates forces on a tail portion 227 (see FIG. 9B) of the clamping ring 211 which shifts the clamping ring in direction 134. This releases the clamping ring head portion 221 from the underside 227 of the spindle ring 104 and creates a gap 225 between the clamping ring 211 and the spindle ring 104.

With reference to FIGS. 8-9B, the housing 50 has a hydraulic line 230 connected to the exterior port 64 (see FIG. 2) and includes an interior port 232 that permits hydraulic fluid flow into and out of the chamber 68 above the locking ring 130. The hydraulic line 230 is also in fluid communication with the chamber 217 below the inner portion 219 of the clamping ring 211. As the hydraulic pressure within the line 230 is increased, the pressure within the chambers 68, 217 increases which shifts the locking ring 130 and clamping ring 211 toward each other in directions 132, 134 and causes hydraulic fluid to flow into the chambers 68, 217. Conversely, decreasing hydraulic pressure within the line 230 decreases the pressure within the chambers 68, 217 which permits the locking ring 130 and clamping ring 211 to be shifted apart to their unlocked positions away from the spindle ring 104 and causes hydraulic fluid to flow out of the chambers 68, 217.

The housing 50 has a hydraulic line 240 connected to the exterior port 66 (see FIG. 2) and includes an interior port 242 that permits fluid flow into and out of the chamber 70. In one approach, the hydraulic line 240 extends through a through opening 244 (see FIG. 5) of the housing ring 122 and o-rings 246 form seals between the housing ring 122, the housing body 120, and the housing cap 212. As hydraulic pressure within the line 240 is increased, the pressure within the chamber 70 increases which urges the pusher ring 210 upward in direction 132 so that its pins 216 lift the locking ring 130 upward to disengage the locking ring 130 from the spindle ring 104. The increased pressure within the chamber 70 also urges the tail portion 227 of the clamping ring 211 downward in direction 134 away from the spindle ring 104 so that both the locking ring 130 and the clamping ring 211 are disengaged from the spindle ring 104.

Figure 11:
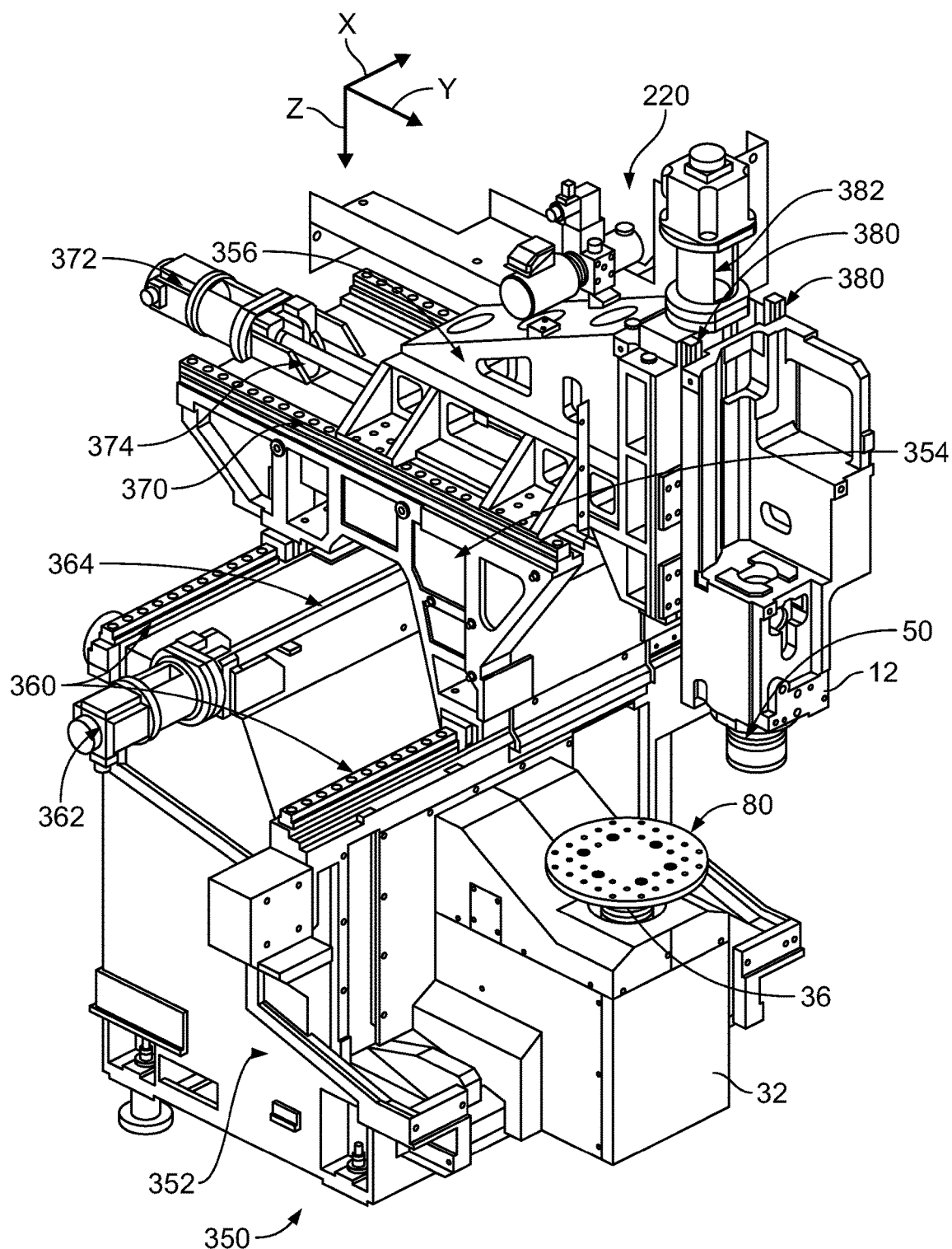
FIG. 11 is a perspective view of the machine tool of FIG. 1 with portions of the machine tool removed to show drive mechanisms of the machine tool.

With reference to FIGS. 1 and 11, the vertical machine tool 10 includes a controller 231 and a hydraulic unit 220. The hydraulic unit 220 is associated with the actuator 62 and is operable to fix the spindle 16 against rotation relative to the housing 50. In one approach, the controller 231 is a programmable electronic controller with a memory for storing machine code instructions and a processor for executing the stored machine code instructions, which may be programmed directly into the controller 231 by a user or transferred to the controller 231 such as via an intranet. The controller 231 can be programmed using a variety of programming techniques, such as conversational and EIA/ISO programming.

Figure 12:
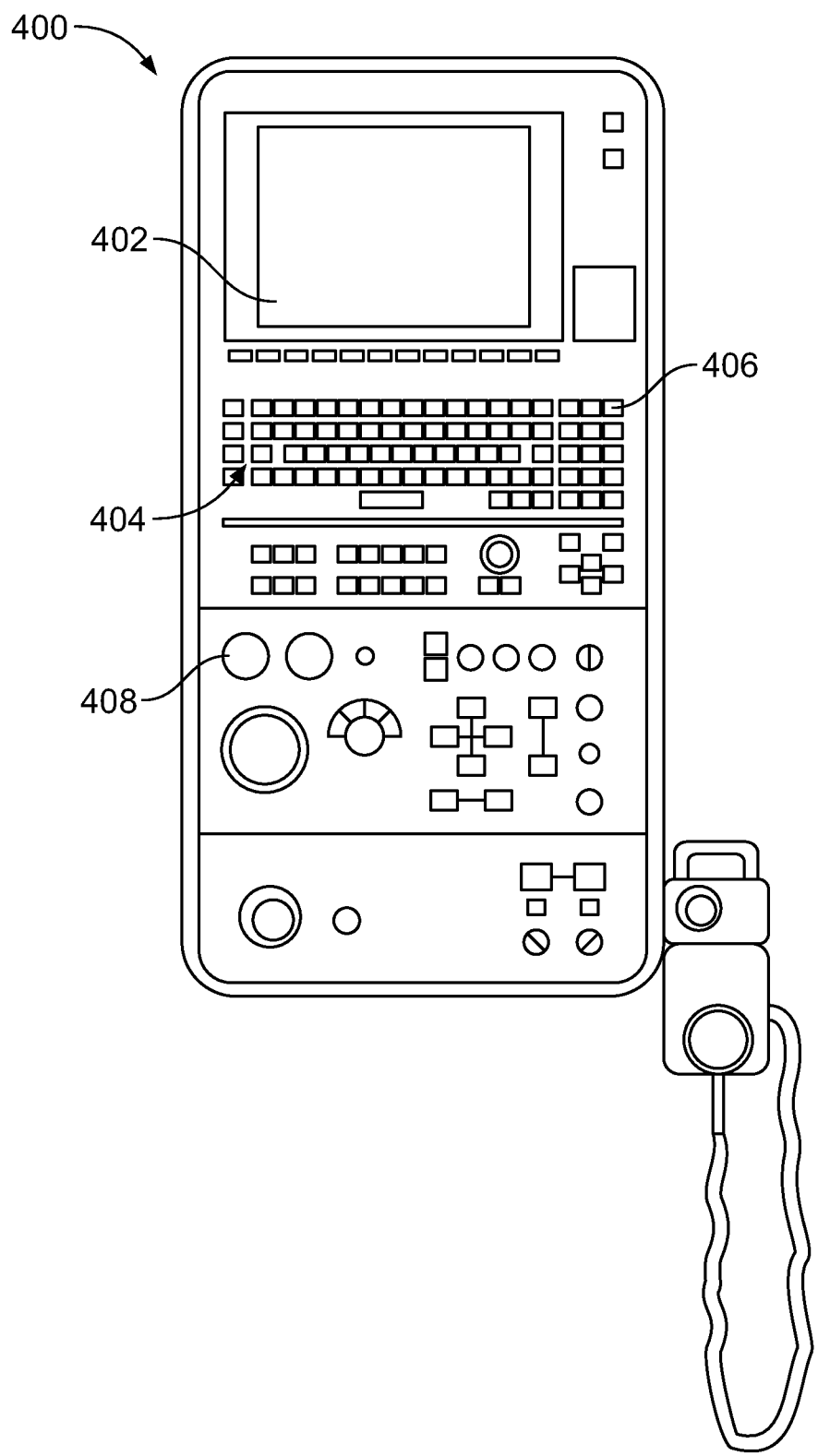
FIG. 12 is an elevational view of a user interface of a controller of the machine tool of FIG. 1.

With reference to FIG. 12, the controller 231 includes a user interface 400 having a display 402 and a user input 404. The display 402 displays a graphical user interface associated with machine operation and the user can interact with the graphical user interface using the user input 404. In one form, the user input 404 has keys 406 for receiving alpha-numeric inputs from a user and controls 408 for adjusting particular operations of the machine 10. The display 402 may receive inputs from a user such as with a touchscreen operation. In one form, the user interface 400 includes a Mazatrol Matrix 2 user interface.

The controller 231 is configured to be operable to, among other operations, cause the hydraulic unit 220 to reconfigure the locking mechanism 60 between unlocked and locked configurations. To shift the locking ring 130 and the pusher ring 210 from the unlocked position of FIG. 9B to the locked position of FIG. 9A, the controller 231 of the vertical machine tool 10 causes the hydraulic unit 220 to increase the pressure of hydraulic fluid within the hydraulic line 230 (see FIG. 8) and increases the hydraulic pressure within the chamber 68. The controller 231 concurrently causes pressure in the chamber 70 to be released and permits fluid flow out of the chamber 70 through the hydraulic line 240. Because the chamber 68 contains highly pressurized hydraulic fluid and the chamber 70 contains low pressure hydraulic fluid, the high pressure hydraulic fluid in the chamber 68 urges the locking ring 130 downward in direction 134 to seat the locking ring 130 against the spindle and housing rings 104, 122. As the locking ring 130 shifts downward in direction 132, the locking ring 130 abuts the pins 216 of the pusher ring 210 and urges the pusher ring 210 downward in direction 134. The outer surface areas and shapes of the locking ring 130, pusher ring 210, and clamping ring 211 may be configured to provide desired performance characteristics of these components such as their rate of movement between locked and unlocked positions and the forces the components apply to other components in response to the hydraulic pressure.

As noted above, the chamber 217 below the inner portion 219 of the clamping ring 211 is in fluid communication with the hydraulic line 230. When the controller 231 causes the hydraulic unit 220 to increase the pressure of hydraulic fluid within the chamber 68, the hydraulic unit 220 also increases the pressure of hydraulic fluid within the chamber 217. The high pressure fluid within the chamber 217 applies forces against the underside of the inner portion 219 of the clamping ring 211 and urges the clamping ring 211 upward in direction 132 so that the clamping ring inner head 221 engages the underside 223 of the spindle ring 104. The controller 231 causes high pressure within the chambers 68, 217 to be maintained during turning operations to rigidly clamp the spindle ring 104 between the locking ring 130 and clamping ring 211 and keep the teeth 172, 174 of the spindle and housing rings 104, 122 tightly engaged in the recesses 184 of the locking ring 130.

To shift the locking ring 130, pusher ring 210, and clamping ring 211 from their locked positions to their unlocked positions, the controller 231 operates the hydraulic unit 220 to release the pressure in the chambers 68, 217 and permit fluid to flow out of the chambers 68, 217. The controller 231 also operates the hydraulic unit 220 to increase the pressure within the hydraulic line 240 and produce a high pressure within the chamber 70 below the pusher ring 210. Because the chamber 68 contains low pressure hydraulic fluid, the high pressure fluid in the chamber 70 can urge the pusher ring 210 upward in direction 132 and overcome the hydraulic force holding the locking ring 130 against the spindle and housing rings 104, 122. The pins 216 of the pusher ring 210 contact and lift the locking ring 130 in direction 134 so that the locking ring lands 182 disengage from the spindle ring teeth 172 and partially disengage from the housing ring teeth 174 as discussed above.

The high pressure in the chamber 70 applied by the hydraulic unit 220 also acts against the outer tail portion 227 of the clamping ring 211 and urges the clamping ring 211 downward in direction 134. This disengages the inner head portion 221 from the underside 223 of the spindle ring 104 so that the spindle ring 104 is no longer sandwiched between the locking ring 130 and the clamping ring 211. With the locking ring 130 and clamping ring 211 moved apart away from the spindle ring 104, the spindle and housing rings 104, 122 are uncoupled. The controller 231 may now cause the headstock motor 14 to drive the spindle 16 about the axis 52 and perform milling operations using a tool 18 received in the spindle 16.

Figure 10:
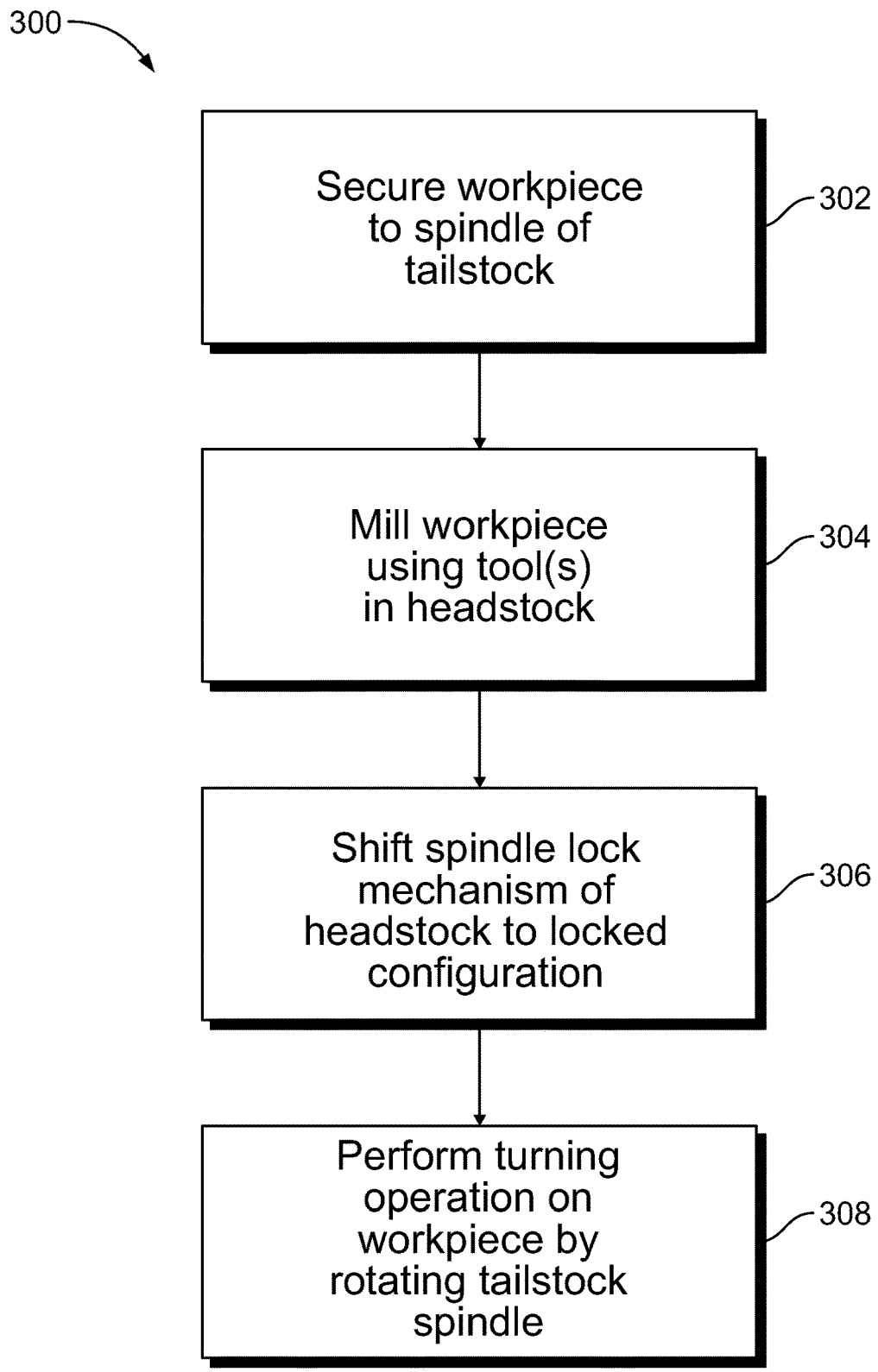
FIG. 10 is a method of machining a workpiece using the machine tool of FIG. 1 including performing milling and turning operations.

With reference to FIG. 10, a method of operating the vertical machine tool 10 is shown that includes performing both milling and turning operations on the workpiece 30 without having to remove the workpiece 30 from the vertical machine tool 10. Initially, the workpiece is secured 302 to the spindle 36 of the lower tailstock 32. This may include bolting or using fixtures to secure the workpiece 30 to the table 80 of the spindle 36.

The carousel tool magazine 40 may be indexed to a desired milling tool 18 and a tool picker of the machine tool 10 automatically loads the milling tool 18 into the upper spindle 16. Alternatively, a user may manually load the milling tool 18 into the upper spindle 16. With reference to FIG. 4, the spindle 16 includes a tool receiving socket 160 for receiving one of the tools 18. The spindle 16 also includes a spindle clamp 162 for releasably securing the tool 18 in the socket 160 during machining operations. Once the tool 18 is received in the spindle 16, the spindle clamp 162 is shifted to an operating configuration to secure the tool 18 in the spindle 16. In one form, the spindle 16 includes a HSK-63A connection for connecting the spindle 16 to the tool 18. With the milling tool 18 secured to the spindle 16, the workpiece 30 is milled 304 using the tool 18. The milling operation 304 may include using several tools 18 to perform different aspects of the milling operation on the workpiece 30.

The vertical machine tool 10 may then shift the spindle clamp 162 to a release configuration, remove the milling tool 18 from the socket 160 of the spindle 16, put the milling tool 18 back into the carousel tool magazine 40, remove a turning tool 18 from the carousel tool magazine 40, load the turning tool 18 into the spindle socket 160, and shift the spindle clamp 162 to the operating position to secure the turning tool 18 in the spindle 16. The carousel tool magazine 40 may hold a number of different tools 18 for the various operations that can be performed, such as twenty or thirty tools 18. Each pocket of the magazine 40 may accommodate a tool 18 having a maximum diameter of approximately 80 mm with tools 18 received in all of the pockets of the magazine 40. If tools 18 are received in every other pocket in the magazine 40, the pockets 40 can accommodate tools 18 having a maximum diameter of approximately 125 mm.

Next, the locking mechanism 60 is shifted 306 to the locked configuration to fix the upper spindle 16 with the turning tool 18 received therein against rotation relative to the spindle housing 50. The locking 306 operation may include shifting the locking ring 130, pusher ring 210, and clamping ring 211 from unlocked positions to locked positions, as generally discussed above, to form a rigid coupling between the spindle and housing rings 104, 122.

A turning operation 308 may then be performed by using the turning tool received in the now rotationally-locked spindle 16. Specifically, the spindle 16 and the turning tool 18 connected thereto may be moved vertically and laterally to contact the workpiece 30 as the motor 34 drives the table 80 and workpiece 30 secured thereto about the axis 90 (see FIG. 3) at speeds sufficient to perform turning operations on the workpiece 30 using the turning tool 18. The motor 34 may rotate the table 80 at speeds up to 2500 RPM while the locking ring 130 rigidly couples the spindle and housing rings 104, 122 together. The rigid coupling resists rotation of the spindle 16 and transfers loading from the turning operation to the housing 50 via the engaged spindle, housing, and locking rings 104, 122, 130. This approach provides a more stable spindle 16 over one that only uses resistance of the headstock motor 14, such as when the motor 14 is in an off condition and not energized, to resist turning of the spindle 16 because the rigid, mechanical engagement between the rings 104, 122, 130 is stronger and more able to resist turning of the spindle 16 than the magnetic resistance of the headstock motor 14 alone.

Although the method described above is generally presented in sequential order, it will be appreciated that the operations may be modified, combined, removed, or performed in a different order than the order presented. Further, additional or fewer actions may be performed at each operation without departing from the teachings of this disclosure.

With reference to FIG. 11, the vertical machine tool 10 has a frame 350 for supporting the headstock 12 and the tailstock 32. The frame 350 has a base 352 for resting on a surface such as a factory floor, a carriage 354 slidably connected to the base 352, and a mounting portion 356 slidably connected to the carriage 354. When the locking mechanism 60 is in the locked configuration to positively fix the spindle 16 to the headstock housing 50, the loading imparted on the turning tool 18 is borne by the frame 350 with the mounting portion 356 transferring loading to the carriage 354 and ultimately to the base 352.

The slide connection between the carriage 354 and the base 352 includes linear guide bearings 360 that restrict movement of the carriage 354 to linear movement along an X-axis relative to the base 352. The machine tool 10 includes an X-axis drive mechanism, such as a motor 362 mounted to the base 352 for rotating a shaft 364 connected to a ball screw mounted to the carriage 354 and transfers rotation of the shaft 364 into linear movement of the carriage 354 along the X-axis. The controller 231 is operably coupled to the motor 362 and may operate the motor 362 to rotate the shaft 364 and shift the carriage 354 back and forth along the X-axis as desired. The base 352 and carriage 354 provide a distance of travel for the spindle 16 along the X-axis, which in one form is approximately 505 mm.

Similarly, the slide connection between the mounting portion 356 and the carriage 354 includes linear guide bearings 370 that restrict movement of the mounting portion 356 to linear movement along a Y-axis relative to the carriage 354. The machine tool 10 includes a Y-axis drive mechanism, such as a motor 372, mounted to the carriage 354 for rotating a shaft 374 connected to a ball screw mounted to the mounting portion 356 that transfers rotation of the shaft 374 into linear movement of the mounting portion 356. The controller 231 is operably coupled to the motor 372 and may operate the motor 372 to rotate the shaft 374 and shift the mounting portion 356 back and forth along the Y-axis as desired. The carriage 354 and the mounting portion 356 provide a distance of travel for the spindle 16 along the Y-axis, which in one form is approximately 400 mm.

The frame 350 also includes a slide connection between the headstock 12 and the mounting portion 356. The slide connection may include Z-axis linear guide bearings 380 for restricting movement of the headstock 12 to linear movement along the Z-axis relative to the mounting portion 356. The machine tool 10 includes a Z-axis drive mechanism, such as a motor 382 mounted to the mounting portion 354 for rotating a shaft connected to a ball screw mounted to the headstock 12 that transfers rotation of the shaft into linear movement of the headstock 12. The controller 231 is also operably coupled to the motor 382 and may operate the motor 382 to shift the headstock 12 up and down along the Z-axis. The headstock 12 and mounting portion 356 provide a distance of travel for the spindle 16 along the Z-axis, which in one form is approximately 510 mm.

With the locking mechanism 60 shifted to its locked configuration, the spindle 16 is secured against rotation relative to the spindle housing 50. However, the vertical machine tool controller 231 may still move the turning tool 18 secured to the now rotationally restricted spindle 16 in the X, Y, and Z directions by operating the respective motors

362, 372, 382. This can be used to maneuver the turning tool 18 about the workpiece 30 being driven by the lower tailstock motor 34.

The machine tool 10 utilizes rapid repositioning of the spindle 16 to minimize loss time. For example, the motors 362, 372, 282 may be operable to move the spindle 16 in X, Y, and Z directions at speeds up to 24 meters per minute.

With reference to FIG. 1, the machine tool 10 may have overall width, length, and height dimensions of approximately 2150 mm×approximately 3155 mm×approximately 3176 mm. The machine tool 10 may have an overall weight of approximately 7,045 kg. The machine tool 10 may have anchors 450 for securing the machine tool 10 to a surface. For example, the surface may be a concrete surface and the anchors 450 may include toe clamps or fasteners for securing the machine tool 10 to the concrete.

Those skilled in the art will recognize that a wide variety of modifications, alterations, and combinations can be made with respect to the above-described embodiments without departing from the spirit and scope of the invention, and that such modifications, alterations, and combinations are to be viewed as being within the scope of the claims.

What is claimed is:

1. An upper headstock for a vertical machine tool having a lower tailstock that rotatably supports a workpiece, the upper headstock comprising:
    a housing;
    a spindle rotatable about a vertical axis relative to the housing and having a lower portion for receiving a tool for machining the workpiece;
    a locking portion of the spindle;
    a locking member extending about the spindle and vertically shiftable along the spindle vertical axis from an unlocked position vertically spaced from the spindle locking portion to a locked position engaged with the spindle locking portion and the housing to fix the spindle relative to the housing; and
    a clamping member extending about the spindle and disposed opposite the spindle locking portion from the locking member so that the locking portion of the spindle is between the clamping member and the locking member along the spindle vertical axis, the clamping member being vertically shiftable along the spindle axis from a retracted position spaced from the spindle locking portion to a clamping position wherein the clamping member sandwiches the spindle locking portion between the clamping member and the locking member in the locked position thereof to keep the spindle locking portion engaged with the locking member.

2. The vertical machine tool upper headstock of claim 1 wherein the spindle locking portion is annular and the housing and locking member each include an annular portion, the annular portion of the locking member being sized radially so that the locking member annular portion is axially aligned with both of the spindle locking portion and the housing annular portion and engages both of the spindle locking portion and the housing annular portion with the locking member vertically shifted to the locked position thereof.

3. The vertical machine tool upper headstock of claim 1 further comprising a pusher member extending about the spindle and vertically shiftable along the spindle vertical axis from a locked position that permits the locking member to engage the spindle to an unlocked position that disengages the locking member from the spindle.

4. A vertical machine tool including the upper headstock of claim 1 and further comprising a hydraulic actuator operable to shift the locking member vertically along the spindle vertical axis between the unlocked and locked positions.

5. The vertical machine tool upper headstock of claim 1 wherein the locking member extends completely around the spindle.

6. The vertical machine tool upper headstock of claim 1 wherein the spindle includes an axially extending tubular wall and the spindle locking portion extends laterally outward from the tubular wall, the spindle locking portion arranged so that the locking member engages the spindle locking portion as the locking member shifts vertically along the spindle axis to the locked position thereof.

7. The vertical machine tool upper headstock of claim 1 wherein the locking member and the spindle each include a plurality of axially extending coupling members sized to overlap axially and be in interference with each other which resists rotation of the spindle relative to the housing with the locking member vertically shifted to the locked position and sized to be in clearance with each other which permits rotation of the spindle relative to the housing with the locking member vertically shifted to the unlocked position.

8. The vertical machine tool upper headstock of claim 7 wherein the housing includes a plurality of axially extending coupling members sized to overlap axially and be in interference with the coupling members of the locking member, wherein the housing coupling members resist rotation of the locking member relative to the housing with the locking member in both the unlocked position and the locked position.

9. The vertical machine tool upper headstock of claim 1 wherein the housing includes a locking member channel that receives the locking member and a clamping member channel that receives the clamping member, the locking member channel and the clamping member channel containing hydraulic fluid and being in fluid communication with each other.

* * * * *